(12) United States Patent
Moreau et al.

(10) Patent No.: US 6,243,706 B1
(45) Date of Patent: Jun. 5, 2001

(54) SYSTEM AND METHOD FOR MANAGING THE CREATION AND PRODUCTION OF COMPUTER GENERATED WORKS

(75) Inventors: Sylvain Moreau; Réjean Gagné; Claude Cajolet, all of Montreal (CA)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/121,972

(22) Filed: Jul. 24, 1998

(51) Int. Cl.[7] .................................................. G06F 17/30
(52) U.S. Cl. .................................. 707/101; 707/1; 707/3; 707/203
(58) Field of Search .............................. 707/203, 1, 101, 707/3

(56) References Cited

U.S. PATENT DOCUMENTS

| | | | |
|---|---|---|---|
| 5,175,852 | * 12/1992 | Johnson et al. | 707/8 |
| 5,220,657 | * 6/1993 | Bly et al. | 707/204 |
| 5,317,733 | 5/1994 | Murdock | 707/203 |
| 5,490,270 | * 2/1996 | Devarakonda et al. | 707/203 |
| 5,615,373 | * 3/1997 | Ho | 707/8 |
| 5,734,898 | * 3/1998 | He | 707/203 |
| 5,737,536 | * 4/1998 | Herrmann et al. | 395/200.59 |
| 5,813,016 | * 9/1998 | Sumimoto | 707/201 |
| 5,832,521 | * 11/1998 | Klots et al. | 707/203 |
| 5,835,601 | * 11/1998 | Shimbo et al. | 707/203 |
| 5,835,908 | * 11/1998 | Bennett et al. | 707/10 |
| 5,862,346 | * 1/1999 | Kley et al. | 395/200.73 |
| 5,913,213 | * 6/1999 | Wikstrom et al. | 707/8 |

FOREIGN PATENT DOCUMENTS

| | | | |
|---|---|---|---|
| 0 319 232 A2 | 6/1989 | (EP) | 15/40 |
| 0 793 184 A2 | 9/1997 | (EP) | 17/60 |
| 0 831 398 A1 | 3/1998 | (EP) | 9/46 |
| 2319367 | 5/1998 | (GB) | 17/30 |

* cited by examiner

*Primary Examiner*—Hosain T. Alam
*Assistant Examiner*—Frantz Coby
(74) *Attorney, Agent, or Firm*—Kenneth L. Milik; Lawrence E. Monks (57) ABSTRACT

A system and method for managing the creation and production of computer generated works permits two or more users to create a work by a collaborative process. The work, or a component of a work, to be created and/or produced is organised into a project structure which includes a plurality of scene structures, each of which can include a plurality of element structures which are used to construct the scenes. A project manager device operates to manage the accessing and modification of elements structures and scenes in the project by the users and manages the relationships between elements structures. The project manager device performs read reference locking of element structures and scenes to ensure that users are always using an appropriate version of the elements and/or scenes and that updates to elements and scenes are correctly propagated to other elements and to users. The project manager device allows users to work in parallel, on different elements and scenes, without requiring other elements or scenes to have been completed and allows users the ability to interact with other elements or scenes, whether completed or not, while an element or scene of interest is worked on by the user. The system and method allow the decomposition of a work into elements which can be re-used and/or which can easily be altered and modified. The system and method is essentially non-intrusive to users and much of the management of the creation and production of the work is performed automatically by the system and method.

11 Claims, 4 Drawing Sheets

SYSTEM AND METHOD FOR MANAGING THE CREATION AND PRODUCTION OF COMPUTER GENERATED WORKS

FIELD OF THE INVENTION

The present invention relates to a system and method for managing the creation and production of computer generated works. More specifically, the present invention relates to a system and method to allow the creation and production of works, such as 2D and 3D computer animations, special effect visuals for motion pictures and other computer generated information, the creation and production being managed by the system and method to permit parallel creative and production activities to be performed.

BACKGROUND OF THE INVENTION

The creation and production of works such as motion pictures and television series is well known. Generally, raw footage (film or video) is shot with the actors over some period of time and the raw footage is subsequently edited, special effects created and incorporated and the final work produced. One of the problems with such creation and production processes is that they are largely linear, i.e.—all of the footage of the actors must be shot before editing and other post production activities are performed.

As this linearity increases the time required to produce the final work, it generally also increases the cost of making the work. Further, it is not unknown that as the editing and/or other post production activities are performed, problems are identified which require additional footage to be shot, which can incur significant expense, or which requires the director of the work to change the work, usually in otherwise undesired ways, when it is not possible to shoot new footage.

Various techniques are employed to mitigate these expenses and risks which result from this linearity and these include various continuity and storyboarding operations to manage the process of obtaining necessary footage and using "first units" and "second units" to obtain required footage in parallel, wherever possible.

To date, works created and produced with computer generated content have followed a process much like that for conventional film and video works for a variety of reasons. Thus, these works have been created and produced in a linear fashion wherein one activity is essentially completed before a second is commenced. For example, in a 3D animation the process of creating the 3D models will be completed, then the backgrounds and/or sets are completed and then the models are placed in the backgrounds and/or sets to allow the animations to be completed. This linearization of the creation and production process results in many of the same disadvantages as with the conventional video and film creation and production process discussed above.

Specifically, it results in long production times (e.g. the animators cannot start the animation of the models until the backgrounds and/or sets have been completed), and can result in significant errors/undesirable aspects remaining undetected until the final assembly of the various components (models, animation data, sets, etc.) of the work.

In such a case, depending upon the seriousness and/or type of the errors, various stages of the process may have to be re-performed. In some circumstances, such as the case wherein a set has to be changed, a large part of the creation process may have to be re-performed to accommodate the changes and models, animations, etc. may have to be modified. Often, these corrective modifications also have to be performed in a linear fashion, adding further to the expense and delays of correcting the work.

The present inventors have determined that computer generated works, including 2D and 3D animations and visual special effects, should be more susceptible to creation and production in a parallel manner than conventional works produced with real actors, sets, etc. While it is clear that a computer generated character (such as the T-Rex in Jurassic Park™) can be placed in more than one scene at a time, to date systems for creating and producing computer generated works have not well supported this capability.

While some activities can be performed in parallel, such as when an animator works on a particular character while other animators work on other particular characters, the integration of these characters and/or components into the final work is often a problem. Very often characters and/or components will not "fit" with each other when the final work is assembled. For example, a component may not be the correct size, relative to other real or computer generated characters/components in the work, or an animated action for a character may "break" when an object or other character is not located at the location in the final scene where the animator thought it would be. Generally, changes in one portion of a computer generated work can affect one or more other portions of the work and to date no satisfactory solution has existed to manage these changes and thus parallel creative and production tasks have not been widely employed. , Further, due to the typical monolithic storage of a scene (e.g.—the set construction, animated models, animation data, lighting and other rendering information are all stored essentially as single entity), responsibility for a scene is often assigned to a single artist/user, who is said to "own" the scene. The owner of the scene must manage the scene to ensure that: all components of the scene are present; they correspond to one another as needed; and a component is not changed without consideration as to the effect of such changes on other components in the scene. Management of this task is difficult at best and scene owners often restrict access to one artist/user at a time.

It is desired to have a system and method for managing the creation and production of computer generated works such as 2D and 3D animations, special effects and the like which permits two or more users to collaborate on the work and/or components of the work at the same time and which manages the changes to portions of the work and the combining of components into the final work.

SUMMARY OF THE INVENTION

It is an object of the present invention to provide a novel system and method for managing the creation and production of computer generated works such as 2D and 3D animations and/or visual special effects which obviates or mitigates at least one of the above-mentioned disadvantages of the prior art.

According to a first aspect of the present invention, there is provided a method for managing the creation and production of computer generated works by multiple users. A project structure is defined for the work and includes at least one scene structure representing a scene in the work. Each scene structure includes at least one element structure which represents a component, such as an animation model, 3D setting, etc. used in the scene. For each element structure, the project includes a defined list of the permitted type of accesses to the element structure by each user, i.e.—read only, read/write, etc. When a request to access an element structure is received from one of the users, a determination is made from this list as to whether the request can be provided for the user. When the request is permitted, the user is allowed access to the element and a record is maintained of this access until the user has completed the access. When a modification of an element structure is performed by one of the users, a determination is made if another user is accessing the same element structure from the maintained records of accesses and, if another user is still accessing the unmodified element structure, the modified structure is stored until users have finished accessing the unmodified element. At this point, the unmodified element structure is replaced with the modified element structure.

According to another aspect of the present invention, there is provided a system for managing the creation and production of a computer generated work by at least two users. The system comprises at least one data storage device having stored thereon a project structure for the work including at least one scene structure for said work and at least one element structure representing a component for said at least one scene structure. The system also comprises at least two workstations, each permitting a user to access the element structures, and a project manager that is connected to each workstation and to the data storage device. The project manager includes a version and locking manager, to control access to element structures by the users and to identify different version of the element structures, a connections manager to copy defined interdependencies between element structures to each modified element structure, and a reload manager to provide each user with access to the most recent version of each element structure.

The present invention provides a system and method for creating and producing computer generated works by a collaborative process involving two or more users. The work or a component of a work to be created and/or produced is organised into a structure referred to herein as a project which includes a plurality of structures referred to herein as scenes and a plurality of structures referred to herein as elements which are used to construct the scenes. A management device, referred to herein as a project manager, manages the accessing and modification of elements and scenes in a project by the users and manages the relationships between elements. Specifically, read reference locking of elements and scenes is performed automatically to ensure that users are always using an appropriate version of the elements and/or scenes and that updates to elements and scenes are correctly propagated to other elements and to users.

The project manager allows users to work in parallel, on different elements and scenes, without requiring other elements or scenes to have been completed and allows users the ability to interact with other elements or scenes, whether completed or not, while an element or scene of interest is worked on by the user. For example, a user creating an animated character can position the character in a setting to develop an animation wherein the character walks around objects in the setting, despite the fact that the actual objects to be placed in the setting and the background for the setting have yet to be completed.

While powerful, the system and method is essentially non-intrusive to users and much of the management of the creation and production of the work is performed automatically by the system.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
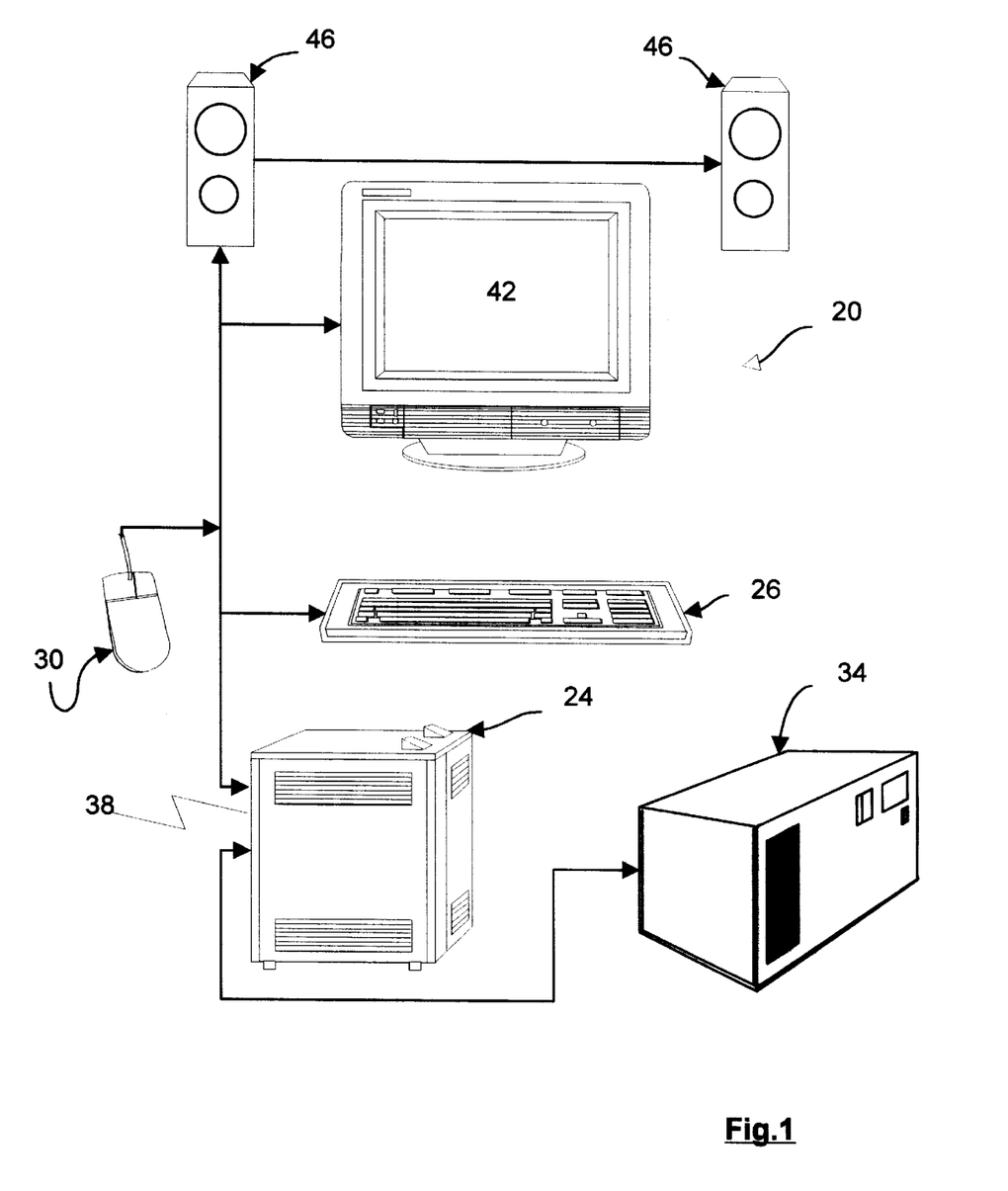
FIG. 1 shows a representation of a workstation used with the creation and production system in accordance with the present invention.

FIG. 1 shows an example of a workstation 20 used, in accordance with the present invention, to create and/or produce computer generated works or components of works. As used herein, the term "work" is intended to comprise any visual or audio output which is created on a computer system. Examples of works include, 2D or 3D animations, portions of such animations to be composited with video and/or audio information, special effects such as "morphed" images, etc.

Workstation 20 includes a computer which, for example, can be a general purpose computer system 24 such as a personal computer with an Intel Pentium™ processor and executing Microsoft Windows NT™, or a special purpose computer system, and which executes one or more programs or software tools to create, modify and/or edit computer generated works. For example, computer 24 can execute the Softimage|3D animation program or the Softimage|DS editing suite program, each sold by the assignee of the present invention. Computer system 24 is connected to one or more user input devices, such as keyboard 26, mouse 30, or any other suitable user input device such as a graphics tablet (not shown), etc. While computer system 24 will generally include a non-volatile storage device, additional data storage can be provided by a storage device such as RAID array 34, optical disc drives (not shown), etc.

As will be apparent to those of skill in the art, computer system 24 can be directly connected to storage devices, such as RAID array 34, and/or be connected to storage devices via a suitable communications link, such as LAN network connection 38, etc. System 24 also includes one or more output devices, such as high resolution monitor 42 and stereo audio speakers 46.

Workstation 20 is also connected to one or more servers (not shown) via LAN network connection 38, or other suitable communications link, and various components of the present invention are stored, executed and/or implemented on this server, as described below. While workstation 20 is configured for use as a general purpose workstation for working on animations, special effects, and video and/or audio editing, it is also contemplated that workstations employed with the present invention can be special purpose for a particular intended use. For example, a workstation 20 can be configured with a variety of special purpose audio components and be used solely for audio editing and compositing. Similarly, a workstation 20 can be equipped with special purpose graphics rendering hardware and be used solely for rendering 3D animations. The configuration and operation of such workstations will be apparent to those of skill in the art.

To date, 3D animations and other computer generated works have been produced with a conventional scene-based paradigm wherein a work is comprised of one or more scenes which comprise a setting and one or more objects and/or characters. Each scene is stored in a generally monolithic manner and is created and modified as a whole and independent of the other scenes. In contrast, the present invention employs a component paradigm and provides a means to manage these components.

Figure 2:
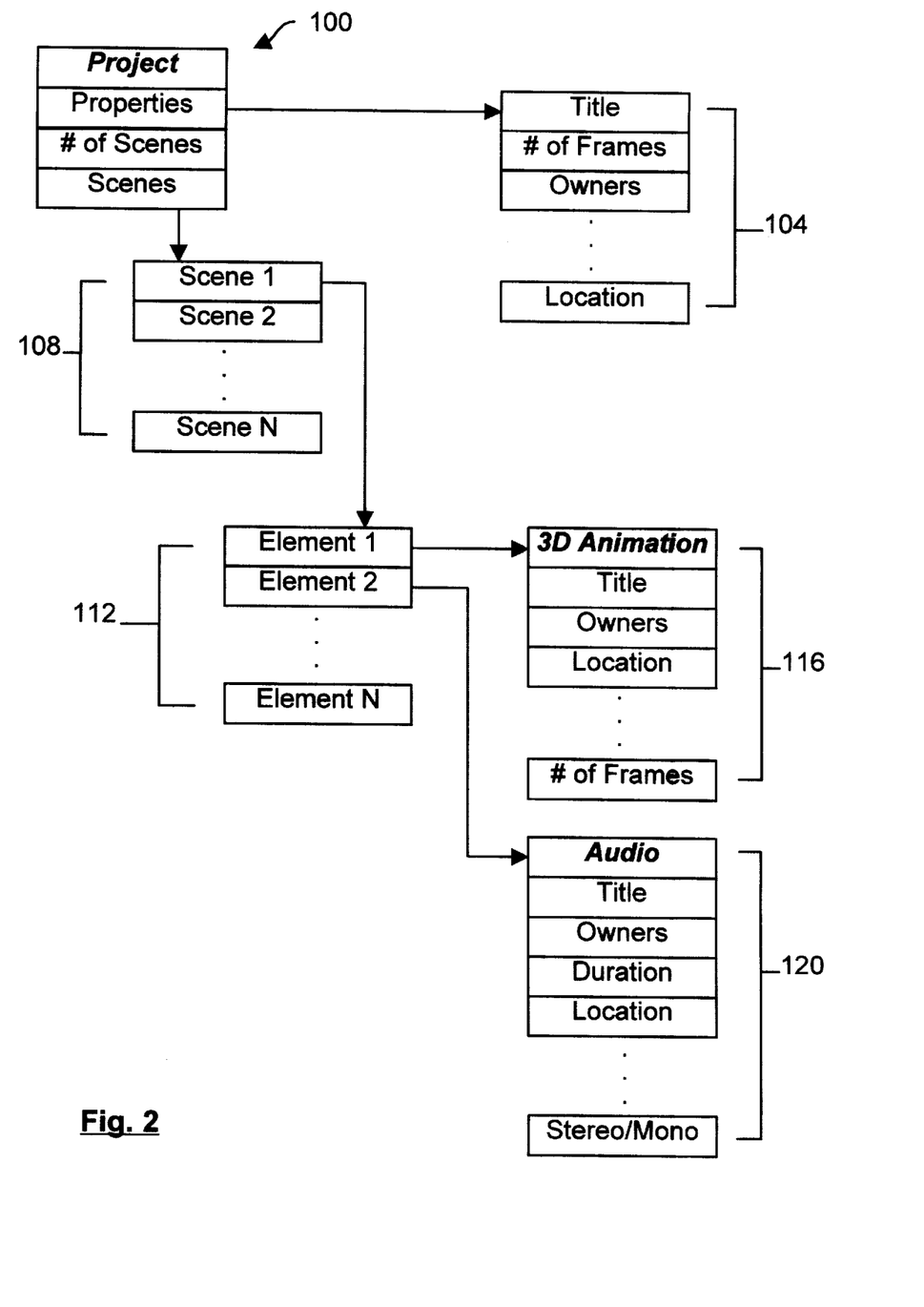
FIG. 2 shows a schematic representation of a project for use with the present invention.

As shown in FIG. 2 a work, or portion of a work, is represented as a project 100. Each project 100 includes a set of properties 104 which comprises a description of the project, including a title identifying the project and, for rendered works, the number of frames to be rendered, the location where the rendered frames are to be stored, which users or groups of users have access to ("own") the project, the units employed within the project (i.e.—meters, feet, centimeters, etc. ), a description of the project, keywords to assist in locating and/or classifying the project, etc. Project 100 can also include data representing the number of scenes in the project and a pointer to those scenes 108 or to other projects (not shown) within project 100.

The use of projects within projects allows works to be created and managed in an hierarchical manner. For example, a 3D animation can have a project 100, named "Rock Show", defined for the complete animation and the Rock Show project contains a first set of scenes involving audience scenes and a second set of scenes involving the rock band musicians. The set of audience scenes can be defined within a project named "Audience" which is a component of the Rock Show project and the set of musician scenes can be defined within a project named "Band" which is another component of the Rock Show project.

In the present invention, each scene 108 comprises one or more elements 112 which are employed within that scene, each element being a component of the scene, such as a character, object, background, setting, etc. In FIG. 2, scene 1 has a set of elements 112 which includes a 3D animation element 116, an audio element 120 and a variety of other elements, not shown.

Each element 112 includes a variety of information which is relevant to the element, including: an appropriate indicator of the type of content such as "3D Animation", "3D set", "Background", "Still Image", "Audio", etc.; an appropriate title for the element, such as "Lead Musician", "Drummer", "Lead Vocals"; a list of the users which can access the element ("owners") and the type of access they are permitted, such as read-only or full access; version and/or timestamp information to indicate the time the element was created or last modified; and information relating to the contents of the element such as the duration, number of frames, sample rate and the actual data of the element, i.e.—an animation model, animation data for a model, audio data, image data, etc.

Another of the perceived advantages of the component paradigm of the present invention is that it allows related data to be represented by different components, for example representing an animation model definition in one component and animation data to be applied to that model as another component. This allows for improved management of the creation and/or modification of a work and assists in maintaining consistency throughout a project. In the particular example of an animation model and animation data, various elements 112 employed in a project 100 can represent different animation data sets (e.g.—animation data representing walking, running, jumping, falling, etc.) for a character which is defined in an animation model represented by a single element 112. The single element 112 representing the animation model can be replicated within each scene 108 as needed so that, when a change is made to the element 112 representing the animation model, the change is propagated to each instance of element 112 in project 100. Alternatively, the element 112 representing the animation model can be copied to individual elements 112, which can then be individually incorporated into scenes 108 and modified as desired.

When a project is created, a master user is defined for the project and this master user, typically the producer for the project, can define the other users, or groups of users which are to be involved in the project and the types of access they are permitted. For example, a group named "Animation Group" can be defined for 3D animators and they can be given read-only access to the entire project, except for the 3D animation elements which they require full access to. In fact, individual animators within the group can be given full access to only those 3D animation elements for which they have responsibility and read-only access to all other 3D animation elements.

The master user and/or other users designated by him, can define scenes and elements for those scenes, as needed. It is contemplated that initially, in most circumstances, a storyboard will be created for the work by the team of users and this storyboard will establish the various scenes to be included in the project and the elements of the scenes. The master user will then create a project 100, the set of scenes 108 and the sets of elements 112 for each scene. Users and their access rights will be defined for the project 100, set of scenes 108 and individual elements in the set of elements 112 for each scene. As will be apparent to those of skill in the art, these definitions and configurations will likely be subject to change as work on project 100 progresses and the master user, or other users designated by the master user, can amend these definitions and configurations as required.

Definition of a project 100 can be performed in a variety of manners, as will be understood by those of skill in the art, and it is presently preferred that a set of project design sheets be presented to the master user in a GUI on a workstation 20 by a project creation process, the completion of these design sheets allowing the project creation process to create the desired project, scene and element structures. Once the definition of a project 100 has been created, users can begin to work on the project and scenes and elements can be added or removed by the master user or any other users who have been assigned the required rights to do so.

Figure 3:
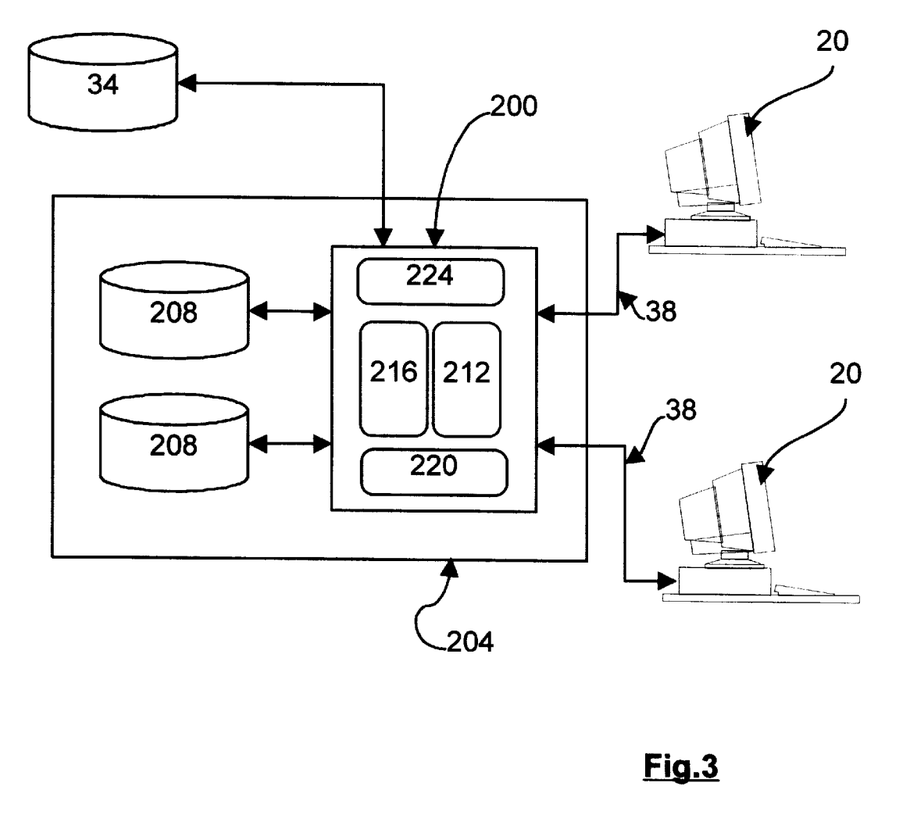
FIG. 3 shows a schematic representation of a network in accordance with the present invention.

FIG. 3 shows a schematic representation of a project manager 200 in accordance with the present invention. Project manager 200, which can be executed on a server 204 on a LAN network to which workstations 20 are connected via network connection 38, manages all access to data relating to a project 100. Project manager 200 is connected to one or more storage devices, such as storage device 34, via the LAN network and/or one or more other storage devices 208 such as high speed and/or high capacity data drives located in server 204 wherein project definitions and all related data for scenes and elements are stored.

Project manager 200 comprises four main functions, namely: access manager 212; version and lock manager 216; connection manager 220; and reload manager 224. Access manager 212 receives all requests for reading or writing any part of project 100 and operates to verify that the user requesting access is permitted the requested access, as defined in the "owners" data in the properties of project 100 and/or in the "owners" data in the elements of the scenes.

Version and lock manager 216 maintains versioning information for all elements in a project as well as element locking tables. When access manager 212 approves a user request to access one or more elements in a project, version and lock manager 216 determines which version, of possibly several versions of the requested element, is the appropriate one to provide to the user. For example, a user responsible for creating animation data for a 3D animation of a character can have read access to an element representing the set to be used in the animation. When the user loads the set element, to test the animation of the character, version and lock manager 216 provides the user with the most recent version of the element for the set and places a read reference lock against that element. Essentially, a read reference lock is a reference which tracks the elements being used by one or more users.

If another user, who owns the element representing the set, attempts to write a new version of that set element, version and lock manager 216 will save the new version of the set element on an appropriate data storage device, and identify this version of the element as the most recent version, but will not overwrite the previous version of the element until all of the read reference locks have been removed, by the corresponding users releasing those elements, or until a reload is performed, as described below. When the user of the previous version of the element releases that version, version and lock manager 216 removes the read reference lock and, if no other read reference locks are present, replaces the old version of the element with the new version.

As will be apparent to those of skill in the art, an element being used by a user can be copied to local storage on the user's workstation 20, for convenience and/or efficiency, or can remain on storage devices 208, etc. and be accessed by the user via network connection 38 as needed.

If desired, version and lock manager 216 can notify a user who has an element read reference locked when a new version- of that element becomes available. In such a case, the user can decide whether to immediately release the old version of the element and load the new version or to continue working with the old version for the time being. For example, if the locked element is a set for an animation, an animator creating an animation to move his character through the set may wish to immediately access the new version of the set to ensure that the animation will correspond to the new set. If the element is a background, an animator animating his character in front of the background can continue with the old version of the background as the change to the background will not affect the movement of his character.

Notification of the availability of new versions of elements can be provided by server 204 via a network message, email or any other suitable method for notifying users, as will occur to those of skill in the art. If a user attempts to access an element for which an new version has been created but not yet set as the newest version due to one or more read reference locks remaining on the old version, the user can be presented with a choice of which version of the element he wishes to access. By default, access will be provided to the newest version as it is contemplated that this will most often be appropriate but access to the older version can also be provided and, in such a case, another lock will be placed against the older version by version and lock manager 216.

While in many circumstances users will want to work with the most recent version of an element, it is also contemplated that a user may wish to work with a preceding version of an element. For example, an element representing a set of animation data may have been updated from a first version, say V1.0, to a second version, V2.0. In this case, the user can select either version 1.0 or 2.0 from an appropriate dialog box, or by any other suitable means. If the user has write access for the element and makes a change to V1.0, the new version will be stored as an update to Version 1.0, i.e.—V1. 1, etc., rather than to V2.0. If the user makes a change to the most recent version, i.e.—V2.0, the user is presented with the option of storing the updated element as either V2. 1, etc. or as a new major version, i.e.—V3.0.

If the owner of an element attempts to write to that element and version and lock manager 216 does not have any read reference locks open on that element, the new version is identified as the most recent version and the old version can be stored or removed from the system, as desired.

Version and lock manager 216 operates to maintain consistency of elements within the project and allows two or more users to access and use elements at the same time, without the users having to explicitly worry about consistency of the elements they are employing.

Connection manager 220 allows the creation and managing of interdependencies between different elements, referred to herein as connections. For example, a 3D animation element can comprise a musician character who is to walk across a stage in another element. In this case, a connection is established by the user between the animation element and the stage element such that the character will walk on the surface of the stage and not above or below it. Once established, connections between elements are maintained by connections manager 220 and, when version and lock manager 216 replaces an element with a new version of an element, any connections associated with the previous version of an element are propagated to new elements by connections manager 220.

Connections are defined in a manner similar to the constraints employed within Softimage|3D V3.7. Specifically, a connection is defined by creating a mathematical and/or logical definition of the relationships between animation parameters in various elements. Connections can be based upon a variety of parameters, including timing, geometry, position, orientation and scaling of objects in different elements, or can be custom, user-defined, parameters and can be created by completing a dialog box which is presented to the animator by connections manager 220. For example, in an animation wherein a character walks through a scene and a variety of other events happen, such as collisions between the character and various objects, etc., the elements in the scene can be connected to the element representing the animation data for the character via time-based connections. Thus, the connected elements will relate to the timing of the character's animation and, changes made to this timing (e.g.—speeding up or slowing down) will be propagated to connected elements accordingly.

Reload manager 224 provides updating of elements in use by users, in accordance with user-specified criteria. It is contemplated that, for efficiency and convenience, users will load several or all elements of a scene, or even the entire project, onto their workstation 20. Each user can define in their preferences how they wish reload manager 224 to update these elements. For example, a user can set his reload preferences to "on demand" and reload manager 224 will only provide the user with the most recent version of elements upon specific request. If the user sets his reload preferences to "periodic", reload manager 224 can provide him with the latest version of any changed elements at specified time intervals, such as hourly. If the user sets his reload preferences to "event based", reload manager 224 will provide him with the latest version of any changed elements upon occurrence of a specified event, such as the saving of a new version of an element, etc.

When a reload of one or more elements is performed for a user, version and lock manager 216 releases and sets the appropriate read reference locks and connection manager 220 ensures that any existing connections between elements are propagated to new versions of those elements.

The present invention allows a user to define, in the user's preferences, which elements and/or scenes are to be provided to the user and these elements will be provided to the user automatically when he connects to server 204 and identifies the project he wishes to work on. Further, any of the elements and/or scenes can be designated as "not visible" for that user to avoid cluttering of the user's screen. For example, if the user is working on a character in a setting, elements in the setting other than the character of interest can be set to not visible by default. To permit the user to check interactions between the character and other elements in the scene, elements which have been loaded as "not visible" can be made visible to the user by changing their status to "visible" on the user's workstation 20. Different users can have different elements, or sets of elements set to "not visible" as appropriate. However, the visible/not visible settings defined by and/or for a user are only applicable for that user and do not affect the visibility parameter of each element which is employed when the project is rendered for animation.

Figure 4:
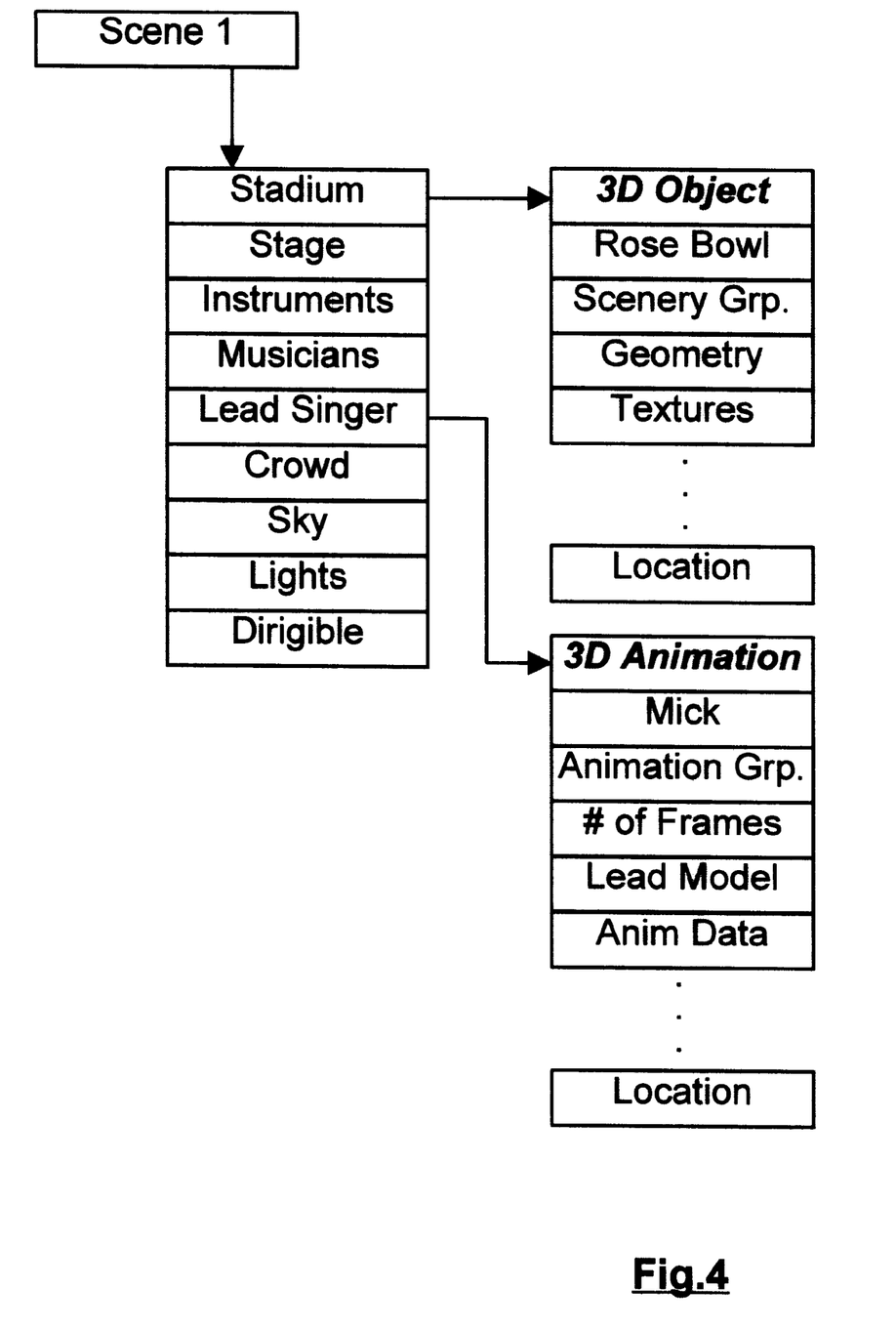
FIG. 4 shows a schematic representation of a scene of a project in accordance with the present invention.

FIG. 4 shows a scene from a project for a 3D animation of an outdoor rock concert. As shown in the example, "Scene 1" includes elements for a stadium, a stage, musical instruments, musicians, a lead singer, a crowd in the stadium, the sky over the stadium, lights for the stage and a dirigible which flies in the sky over the stadium. In this example, the stadium, stage and instruments can be fully modeled 3D objects which are not animated. The musicians can be animated characters, but with not a great deal of detail as they are located behind the lead signer. The lead signer is a 3D animation which is the center of attention within the animation and thus is an elaborate animation. The crowd can be formed of a group of instanced objects and is animated to some extent and the sky is a fixed background with animated clouds. The lights are for stage lighting effects and are animated to some extent and the dirigible which is animated to fly in the sky above the stadium while displaying video information on a screen on the side of the dirigible. One or more audio elements (not shown) would also be included with the scene.

Relevant information for each element is stored in the appropriate element structure. For example, the stadium element is identified as being of type "3D Object", has a title of "Rose Bowl", is shown as being owned by the "Scenery Group" and includes a set of defined geometries, textures applied to those geometries and a storage location for that data. Similarly, the lead singer element is identified as being of type "3D Animation", has a title of "Mick", is shown as being owned by the "Animation Group", employs an element labeled "Lead Model", which is the animation model for the lead singer and includes an element labeled "Anim Data" which is the set of animation data to be employed with the lead singer in this scene.

As will be apparent, a user can work on the lead singer element while the sky and/or crowd elements are modified by other users. Changes to the sky will not affect the lead singer animation, but changes in the animation of the lead singer can result in changes being required for the crowd, to permit the crowd to react at appropriate times to the activities of the lead singer. While a connection is required between the lead singer and the stage to define the height of the stage surface for the lead singer to stand on, work on the lead singer can continue independent of changes made to the stage by another user. Should the changed stage element have a greater or lesser height, connection manager 220 will propagate the stage height connection between the animation data for the lead singer element and the stage element to the new stage element and the placement of the lead singer will still be correct when a reload of the new version of the stage element is performed.

As will also be apparent, work on the lead singer element can proceed when the stadium and/or stage are mere wireframe models, prior to their rendering, rather than the final, complex models have been designed and applied to the musicians.

The present invention enhances the creation and production of computer generated works, such as 2D and 3D animations and visual special effects, by allowing the work to be decomposed work into a variety of elements whose versions and interconnections are automatically managed by the project manager of the present invention allowing two or more users to collaborate, in parallel, on the work. Locking of elements and scenes is performed automatically to ensure that users are always using an appropriate version of the elements and/or scenes and that updates to elements and scenes are correctly provided to users.

Projects, which are the works or portions of works to be created, are decomposed into a variety of elements which enhance parallel operations within the creation and modification of the project, as well as encouraging re-use of many elements, such as animation models, and simplifying the management of the production of the work. While powerful, the system and method are essentially non-intrusive to users and much of the management of the creation and production of the work is performed automatically by the system.

The above-described embodiments of the invention are intended to be examples of the present invention and alterations and modifications may be effected thereto, by those of skill in the art, without departing from the scope of the invention which is defined solely by the claims appended hereto.

We claim:

1. A method for managing the creation and production of a computer generated animation by a plurality of users, comprising the steps of:
   (i) defining a project data structure for the animation, the project data structure including at least one scene data structure associated with a scene of the animation, the scene data structure including at least one element data structure associated with a component of the scene;
   (ii) defining for each said element data structure an access control list of the type of accesses to the respective element data structure permitted to each said user;
   (iii) from at least one of the users, receiving a request to access one of the element data structures, and for the requested access identifying permitted ones of the at least one uses from the access control list associated with the one element data structure;
   (iv) permitting the requested access concurrently for at least two of the permitted users;
   (v) respectively increasing and decreasing a record lock count associated with the accessed element data structure in accordance with an initiation and a termination of said permitted access by each said permitted user; and (vi) upon receipt of a modified one of the accessed element data structures, accessing the record lock count associated with the modified one element data structure, and replacing the accessed element data structure with the modified one element data structure upon accessing a zero value of the accessed record lock count.

2. The method of claim 1 further comprising the step of informing each said user other than said user modifying said element data structure that a modified element data structure has been created.

3. The method of claim 1 wherein the step a choice between accessing said one element data structure and said modified element data structure.

4. The method of claim 3 wherein when a user has selected and modified a structure element other than said most recent structure element, said modified element structure is saved as the most recent version of said selected element structure.

5. The method of claim 1 further comprising the steps of maintaining a record of defined interdependencies between each said element data structure in said project data structure and, propagating any said interdependencies defined for said element data structure to said modified element data structure.

6. The method of claim 5 further comprising the step of updating the access of each one of said at least two users from accessing said element structure to accessing said modified element structure at a time preselected by each said one user.

7. The method of claim 5 further comprising the step of immediately updating the access of each one of said at least two users from accessing said element structure to accessing said modified element structure.

8. The method of claim 1 wherein each one of said at least two users can define a list of element structures to be accessed by said one user each time said project structure is accessed by said one user.

9. A system for managing the creation and production of a computer generated animation by a plurality of users, comprising:

at least one data storage device having stored thereon a project data structure for the animation, the project data structure including at least one scene data structure associated with a scene of the animation and at least one element data structure representing a component for said at least one scene data structure, the at least one data storage device further including an access control list associated with the at least one element data structures;

a plurality of workstations for providing the users with access to the at least one element data structures; and a project manager in communication with the workstations and the at least one data storage device, the project manager being configured to (i) receive, from at least one of the users, a request to access one of the element data structures, (ii) identify in response to the access request permitted ones of the at least one users from the access control list associated with the one element data structure, (iii) permit the requested access concurrently for each said permitted user, (iv) respectively increase and decrease a record lock count associated with the accessed element data structure in accordance with an initiation and a termination of said permitted access by each said permitted user, (v) receive a modified one of the accessed element data structures, (vi) access the record lock count associated with the modified one element data structure, and (vii) replace the accessed element data structure with the modified one element data structure upon accessing a zero value of the accessed record lock count.

10. The system according to claim 9 wherein said workstations and said at least one data storage device are connected to a computer network and said project manager is executed on a server connected to said computer network.

11. The system according to claim 9 wherein said project structure is defined by a user completing a set of project design sheets presented in a graphical user interface on one of said at least two workstations.

* * * * *